Oct. 29, 1968   J. LEVAUX   3,408,177
PROCESS FOR REFINING OR MELTING METALS IN A FURNACE
Filed March 26, 1965   2 Sheets-Sheet 1

United States Patent Office 3,408,177
Patented Oct. 29, 1968

3,408,177
PROCESS FOR REFINING OR MELTING METALS IN A FURNACE
Jean Levaux, Liege, Belgium, assignor to Ste. Ame. Cockerill-Ougree, Seraing, Belgium, a Belgian company
Filed Mar. 26, 1965, Ser. No. 442,931
Claims priority, application Luxembourg, Mar. 28, 1964, 45,773; May 12, 1964, 46,060; Nov. 28, 1964, 47,463
3 Claims. (Cl. 75—43)

ABSTRACT OF THE DISCLOSURE

A metallic charge is heated for refining or melting purposes by means of at least one burner fed with fuel and an oxidising gas, the fuel and oxidising gas being post-mixed before being fed to the burner. As a preferred feature a non-combustible liquid is injected into the burner and this non-combustible material dissociates due to the high temperature, to give rise to elements to whose recombination is highly exothermic. The jet of oxidising gas emerging from the burner preferably has a high speed which is substantially twice the speed of sound. The pressure of the non-combustible liquid is regulated to control the dimensions of the flame.

---

The present invention relates to a process for melting or refining metals in a furnace.

In the description which follows the term "treatment" will be used generically for both melting and refining.

A process generally used for the treatment of metals consists in causing hot gases from the combustion of a fuel as well as an oxidising gas to pass over a metallic charge in a furnace the oxidising gas being heated by means of the sensible heat recuperated from the gaseous products escaping from the furnace. Attempts have been made to improve this process by increasing the temperature of the hot gases projected onto the charge by using an oxidising gas with a high oxygen content. This attempted improvement has however certain disadvantages, for instance the noted increase in the heat of combustion causes damage to the roof and other parts of the refractory lining of the furnace owing to the use of oxygen needed to speed up the operation of the furnace.

The present invention relates more especially to a process for substantially increasing the efficiency of processes for treating metals without damaging the refractory lining of the furnace used.

The process forming the object of the present invention in which a metallic charge is treated in a furnace, is characterised in that the greater part of the treatment is carried out by means of at least one burner which is supplied with a quantity of oxidising gas containing at least sufficient oxygen for completely oxidising the fuel used in the burner, the oxidising gas preferably having a high oxygen content or consisting entirely of commercially pure oxygen.

The use of a mixture of fuel and oxidising substance in the above conditions, that is to say the use of an oxidising substance containing at least sufficient oxygen for the complete oxidation of the fuel emerging from the burner yields combustion gases at a particularly high temperature during practically the whole of a refining operation so that the charge can be raised to very high temperatures so as to reduce substantially the duration of the melting stage and that of any refining stage that may follow.

In the course of the refining operation, which generally follows the melting stage, it is possible to modify the relative proportions of fuel and oxidising substance in such a manner as to render the flame less oxidising or even slightly reducing according to need.

When applied to refining furnaces, the above process makes unnecessary the use of heating gas containing a small proportion of oxygen, as used generally in known processes after being heated in a recuperator. It is thus possible to dispense with recuperation or checker chambers usually used in such furnaces without detrimentally affecting the thermal balance of the operation of the furnace.

This is precisely what renders the invention particularly advantageous from the economic point of view when applied to open hearth furnaces.

It should be noted that in this latter case the above-mentioned advantages are more apparent as the oxygen content of the oxidising gas is increased. It is therefore advantageous to use the highest possible oxygen percentage in the oxidising gas or instead of a mixture, commercially pure oxygen may be used. The temperature of the products of combustion can be increased still further by using a fuel with a very low ash content, preferably a liquid or gaseous hydrocarbon; the results are the more promising the higher the specific heat of the fuel used.

In accordance with an advantageous embodiment of the process in accordance with the invention, the jet of oxidising gas emerging from the burner is given a speed at least equal to the speed of sound and preferably about double the speed of sound so that the fuel can be atomised in a particularly complete and rapid manner, in the case of a liquid fuel, or in the case of a gaseous fuel, the gaseous fuel can be perfectly mixed with the oxidising gas. Therefore the ensuing combustion is the more complete and more of the combustion takes place at a higher temperature. It has been unexpectedly noted that the flame resulting from the combustion of a fuel in stoichiometric proportions with an oxidising gas having a very high oxygen percentage and travelling at about twice the speed of sound, proportionally radiates substantially less heat than a flame produced by a burner working in accordance with conventional methods.

An important consequence of this unsuspected effect is that during a large part of the treatment of the metal, the temperatures of the walls and roof of the furnace are substantially lower than in a furnace used in a conventional method. Thus the life of the walls and the roof is substantially increased.

Another embodiment of the invention which has been found particularly advantageous increases still further the efficiency of the process by augmenting the efficiency of the burners and, as a consequence, their ability to melt metal in the furnace.

In accordance with this embodiment of the invention one injects, into the fuel or the oxidising substance or both, emerging from the burner, non-combustible material capable of dissociating immediately owing to the high temperature of the combustion gases so as to give rise to elements whose recombination is strongly exothermic.

In accordance with a particularly advantageous form of this embodiment, a material is chosen whose dissociation is practically complete at the temperatures of combustion (near or above 2000° C.) and whose recombination at lower temperatures is speedily and completely accomplished, preferably with an almost explosive effect. A substance behaving in this manner has been found to be water vapour.

It has in fact been found that the melting process taking place is substantially accelerated when such products of decomposition recombine energetically a few instants after their decomposition as they are entrained by the gases. Such energetic recombination takes place more especially in the immediate proximity of the metals or scrap to be fused.

In accordance with another form of the invention which is found to be advantageous, the material to be decomposed is used in a liquid form thus simplifying considerably the problem of supplying it to the flame of the burner. A particularly elegant solution to this problem consists in passing the liquid material to this position by means of a tube which can be integrally formed with the burner and preferably placed inside the latter. This arrangement enables the process in accordance with the present invention to be endowed with a functional flexibility which is as noteworthy as it is unexpected.

Moreover, the use of burners in which the mixture of the oxidising substance and the fuel is carried out outside the burner is well known, such burners being sometimes termed "post-mixing burners." Particularly telling results have been obtained using this type of burner supplied with pure oxygen as an oxidising material and with liquid fuel. In such burners the jet of liquid fuel emerging from the burner is for the most part enveloped by jets of oxygen which emerging at a very high speed from the burner atomise the fuel before combustion takes place. The length of the flame and the degree of atomisation depend very largely on the speed of emergence of the oxidising substance.

In this respect it should be pointed out that particularly impressive results have been obtained when a burner of the above described type is used to inject non-inflammable liquid material inside the jet of fuel emerging from the burner at a pressure at least equal to that of the fuel, preferably along the axis of the jet of fuel. The non-combustible liquid is also pulverised by the oxidising gas and forms a triple mixture with the fuel and the oxidising substance so that the heat necessary for the dissociation of the non-combustible liquid can be instantly transmitted to it.

The process in accordance with this embodiment of the invention has a particularly impressive and at first sight surprising advantage: if a diagram of the variation of temperature along the length of the flame produced is studied it will be noted that at a short distance from the end of the burner, that is to say, at the position of combustion properly so-called, there is a zone at an extremely high temperature in which the radiation, proportional to $K.^4$) is particularly great. The heat radiated at this point cannot be recuperated for melting scrap.

It has been determined that injecting water vapour in this zone helps to decrease the temperature at this point without reducing the temperature of the flame where it lies further away from the burner. The vaporisation and dissociation of the water injected thus only operates as a means for rendering heat, which was previously practically completely lost by radiation, available for the melting of scrap. The overall thermal output of the burner is therefore not adversely affected.

In accordance with a yet more impressively advantageous embodiment of the process in accordance with the invention, the pressure of the liquid introduced into the fuel jet is held at a pressure at least equal to the pressure of the fuel. In this manner it is possible to break up the fuel jet both on account of the high pressure of the water and also on account of the immediate vaporisation, the result being that the atomisation of the fuel is more efficient and thorough so as to cause the jets of oxidising gas to diverge thus shortening and broadening the flame.

It is possible to regulate the length and the width of the flame by regulating the pressure and the rate of feed of liquid injected into the jet of fuel emerging from the burners.

Numerous methods of breaking up the fuel jet spring to mind when the basic concept of the invention of employing the axial injection of a liquid is employed.

The process lends itself especially to the production of steels of all types ranging from ultra soft steels to hard steels, including, of course, high alloy steels.

By way of example it is legitimate to point out that while using the process in accordance with the invention it is possible to regulate the carbon content of a steel being made by making necessary additions a few minutes before the end of the fusion operation. Since the refining effect of the burner can be particularly rapid and energetic in action, it is often more efficacious to adjust the carbon content of the metallic bath at the end of the fusion step.

If, moreover, it should be desired to obtain a highly carburised bath of steel, it is possible to add liquid pig iron to a bath with a very low carbon content, when the fusion operation has been completed. When the addition is made the composition of the flame should be modified slightly in such a manner as to render it slightly reducing.

From the point of view of operational considerations it is possible to use a type of burner in which the axis of the flame is inclined in relation to the longitudinal axis of the burner itself, for instance when the burner stem is slightly bent or, more advantageously, when the apertures for the emergence of the fuel and oxidising substance are inclined in relation to the longitudinal axis of the burner. In the latter case the end of the burner can be constituted by a plate which is oblique in relation to the axis of the burner and has the apertures in it arranged in an appropriate fashion. In this case the axes of the apertures will be substantially perpendicular to the plane of the plate.

One of the advantages of this type of burner is constituted by the fact that it operates at very low noise level.

The present invention also relates to a particular embodiment designed to increase still more the efficiency and the rapidity of refining and melting operations as described above.

In accordance with this embodiment of the invention a burner is used which can be manoeuvred so as to turn its jet of burning gas in all directions on the charge so as to permit the jet to be directed, during the course of the operation, onto any yet unmelted parts of the charge so as to bring about an impressive saving in time as regards the complete fusion of the charge of scrap or other material.

It has in fact been observed that the charge undergoes fusion more rapidly when directly contacted by the flame than from heat from neighbouring parts of the charge which are already in a molten condition.

As a result of the invention there is the consequence that the speed of fusion and refining of a given metallic charge can be increased in a substantial fashion while a telling economy is made in installation charges, and consequently, in maintenance and servicing expenses.

Although in the outline just given of this particular form of the invention mention is only made of one burner, this opportunity is taken to state expressly that the invention covers the case where several burners are used in the same furnace. When several such burners are used they can be caused to perform the movements just described in connection with a single burner, either simultaneously or individually.

In accordance with this feature of the invention, a burner supplied in the manner described above is caused to perform a movement following an oscillatory configuration in such a manner that the flame of the burner sweeps the surface of the material to be treated which is decidedly greater than that which would be touched by the flame if the burner were fixed.

The present invention has the further highly advantgeous feature that a burner whose flame axis is at an angle to its own longitudinal axis, can be caused to perform a movement as just described; thus the burner can be caused to perform a movement of rotation about its longitudinal axis. The result is that the zone of impact between the flame and the surface of the material to be treated covers a greatly extended trajectory resembling an elliptical curve.

This rotary movement can be continuous or intermittent and can be controlled automatically or manually.

In accordance with another advantageous characteristic of the process in accordance with the invention the longitudinal axis of the burner is directed in such a manner that the oscillatory movement already referred to causes the flame to contact first one part of the charge to be treated and then another. This movement of the axis of the burner can be continuous or discontinuous as a function of time and the particular angle of incidence of the flame on the metal can be chosen or changed at will so that the burner can be caused at one moment to perform its melting function and then at another instant to refine the material.

This method of operating a burner in accordance with the invention can be carried out either by rotating the burner about a fixed point, for example by means of a ball joint or a gimble or by means of a simple rotation about an axis perpendicular to its longitudinal axis.

While keeping within the bounds of the general philosophical framework of the present invention, it is possible to control movements of the burner by a remote control system, either manual or automatic. Such a control system can be programmed in advance or can be dependent upon some factor connected with the fusion operation, the refining operation, the condition of the refractory lining of the furnace, or with other factors.

The maneuverability of the burner and more especially its ability to be turned and the various control possibilities have numerous advantages including the following which are given by way of illustration and not for purposes of limitation:

(a) It is possible, by means of a burner used in accordance with the principles of the invention to perform judiciously combined and chosen rotary swinging movements, to treat any particular part of a charge to be melted. This is especially the case when heavy scrap is being melted.

(b) It is also possible to select the movements to be performed by the burner in such a manner that the entirety of a charge of scrap is raised to a uniform temperature and consequently uniformly melted. Regular and uniform movement of the burner has been found to produce this result with facility.

(c) The evening out of the heating effect on the scrap avoids any local overheating of the refractories and, consequently, any decomposition or localised wear. This advantage is particularly telling in circular electric furnaces in which the entire charge can be played upon by the flame without playing it upon the refractory.

(d) As has already been indicated, it is possible to use the burner at different intervals of time both for refining and for melting. Refining can for example be carried out by retaining the longitudinal axis of the burner or of the head of the burner (in the case of a burner with an oblique end) in a position which is inclined at a large angle with respect to the horizontal or is nearly vertical while the quantity of fuel injected is reduced. This leads to an improvement of decarburisation of the bath since oxygen is injected mainly into the zone of molten metals. The burner can be used to perform its melting function by directing the flame towards the central zone of the furnace.

(e) Another advantage is to be found more particularly when a remote control system is used for moving the burner, that is to say, the advantage of being able to equip a furnace with several burners each provided with a remote control device for their movements. Such a device can be common to all the burners, or one individual device can be used for each burner. The burners can be caused to perform similar movements or identical movements which may be synchronous or out of phase in such a manner as to combine the actions of the flames on the charge so as to accelerate the melting phase as well as the refining phase. Such a combination of burners is of inestimable value as regards prolonging the life of the refractories lining the furnace for it allows zones of turbulence, which would otherwise have a tendency to occur over the bath, to be reduced or to be avoided completely. Such zones of turbulence are found in conventional furnaces more especially when two burners are placed in opposite walls of a furnace so that their flames meet in the central part of the furnace.

The drawings accompanying the specification, which are not intended to limit the scope of the invention in any way but merely to enable it to be understood by those skilled in the art, will now be referred to.

Figure 1:
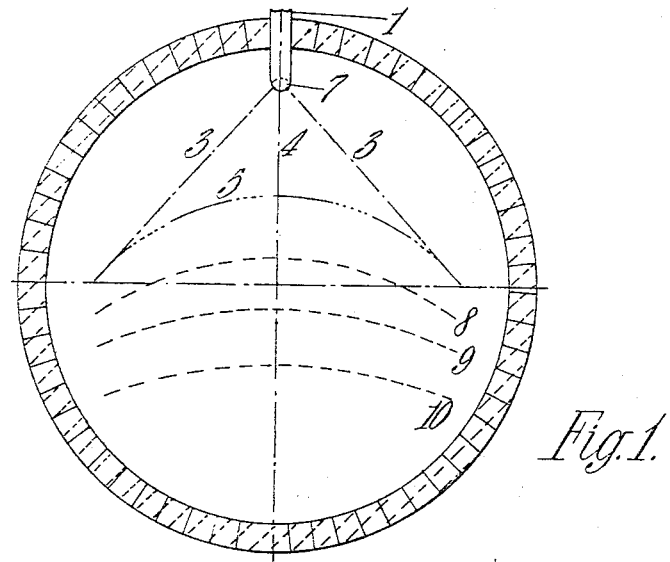
FIGURES 1 and 2 are respectively a horizontal section and a vertical diametrical section of an electric furnace to illustrate one embodiment of the invention.
Figure 2:
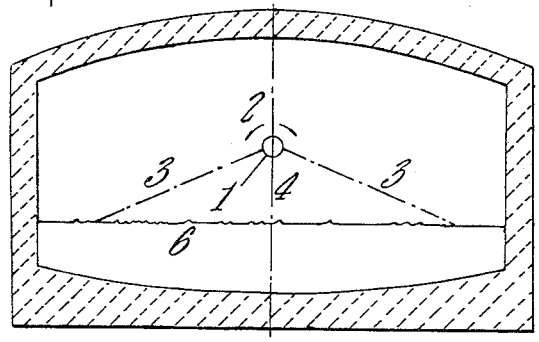

As shown more particularly in FIGURES 1 and 2, the burner 1 with a horizontal axis substantially aligned with a radius of the furnace is caused to rotate either clockwise or anti-clockwise about its axis as indicated by the arrows 2.

The axis 3 of the flame emerges from the burner 1 through the oblique end plate 7 at an angle to the axis of the burner. The flame strikes the upper face 6 of the metallic bath describing a curve 5 when the burner is rotated in accordance with arrow 2. The positions 3 represent the positions of the axis of the flame for the extreme positions of rotation of the burner; 4 represents the position of the same axis when the flame lies in the vertical plane passing through the burner.

Reference numerals 8, 9 and 10 represent the successive positions assumed by the curve 5 when the end 7 of the burner is inclined upwards somewhat.

Figure 3:
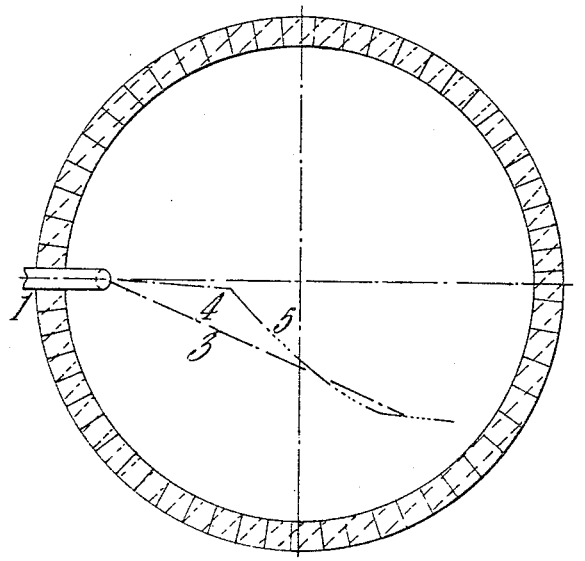
FIGURES 3 and 4 are likewise horizontal and vertical sections of an electric furnace further explaining movements of a burner 1 in accordance with the invention.
Figure 4:
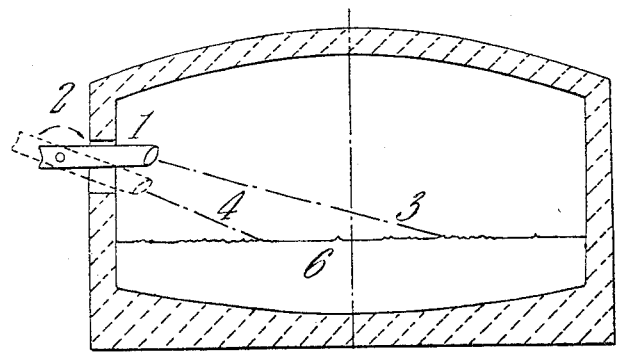

Such a movement of inclination is shown in FIGURE 4 where the burner is shown undergoing a rotation 2 about a horizontal axis which is perpendicular to its longitudinal axis. The combination of these two movements of rotation indicated in the FIGURES 1 to 4 causes the point of impact of the flame 3 on the upper surface of the bath 6 to describe a trajectory 5 (see FIGURE 3) substantially different from that indicated in FIGURE 1, in accordance with the characteristics of the two movements of the burner. The directional movement due to the two movements of rotation of the burner is especially easy to see from FIGURES 3 and 4.

Figure 5:
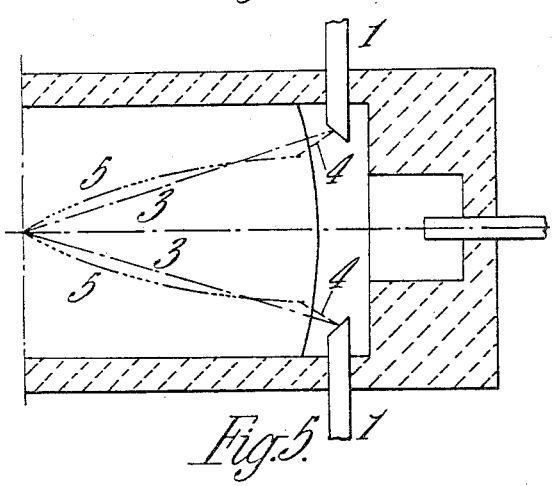
FIGURES 5 and 6 are respectively a horizontal and a vertical longitudinal section of an open-hearth furnace showing the operation of burners in it, in accordance with the invention.
Figure 6:
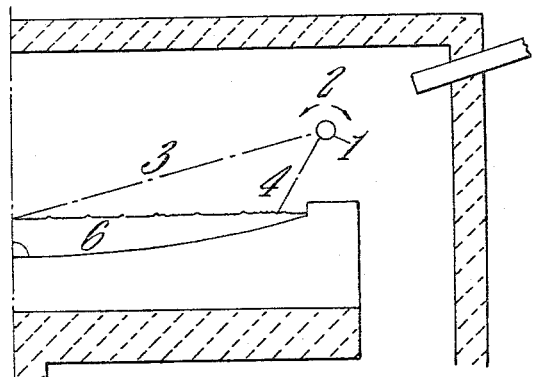

As shown in FIGURES 5 and 6, an open hearth furnace has one end equipped with two oxygen fed burners having oblique end plates. These burners are subjected to a rotation 2 around their longitudinal axes and the flames emerging from them sweep the upper surface 6 of the bath in accordacne with the curves 5 when the axis of the flame moves from 3 to 4 owing to the effect of the rotation of the burner.

As has already been indicated above, the process of the invention is applicable to all furnaces for refining metals, including furnaces with a fixed sole, swing mounted furnaces, fixed converters, moveable converters, and rotary furnaces. It is only necessary to provide around or above the sole or the refining receptable a sufficient number of burners to cover the greater part of the charge with flames as described above in accordance with the invention.

The process of the invention is particularly advantageous when applied to open hearth furnaces and enables such furnaces to be used without recuperators.

The example given below in a non-limiting capacity indicates how the devices described above can be used, and the results that can be achieved.

An open hearth furnace having a floor area of 37 sq. metres was charged with a cold charge of 72 metric tons. The furnace was equipped with two burners above each fire breast, that is to say there were four burners in all having a total rate of feed of 2,400 litres of fuel per hour and 4,800 Nm.$^3$ of pure oxygen per hour.

No hot air was used during the melting of the scrap which lasted, including charge, three hours.

After melting the melt was refined to produce a silicon steel. The refining operation lasted 1½ hours during which the feed rate of pure oxygen was 3,000 Nm.$^3$ per hour and the feed rate of fuel 1,200 litres per hour, the oxygen being fed in at a pressure of 5 kg./cm.$^2$ and the fuel at a pressure of 10 kg./cm.$^2$.

During the entire operation both fusion and refining water was injected into the fuel at a rate of 150 litres per hour.

It can also be mentioned by way of explanation that in an electric furnace in accordance with the invention the oscillation of the burner was 80° in a horizontal plane and 25° in a vertical plane.

I claim:

1. In a process for the treatment of a metallic charge in a furnace, in which the charge is heated by means of at least one burner fed with a combustible agent and a gaseous oxidising agent, the gaseous oxidising agent containing a quantity of oxygen at least sufficient to achieve the complete combusion of said combustible agent, the improvement comprising the steps of carrying out the combustion of said combustible agent by means of a post-mixing burner, mixing the combustible and oxidising agents outside said burner, injecting a non-combustible liquid into at least one of said agents in the burner so that when said liquid dissociates due to the high temperature it gives rise to elements whose recombination is highly exothermic, maintaining the pressure of said injected non-combustible liquid at least equal to the pressure of said combustible agent at the point of injection, and further regulating the pressure of said non-combustible liquid to control the length and width of the flame.

2. A process as claimed in claim 1 in which the burner is caused to follow an oscillatory movement so that the flame of the burner periodically sweeps over the surface of the material to be treated.

3. A process as claimed in claim 1 in which the axis of the flame of the burner is inclined in relation to the longitudinal axis of the burner and that the burner is subjected to a rotary movement about its axis.

References Cited

UNITED STATES PATENTS

| | | | |
|---|---|---|---|
| 1,830,574 | 11/1931 | Thwing | 75 |
| 2,446,511 | 8/1948 | Kerry et al. | 75—43 |
| 2,484,272 | 10/1949 | Crowe | 75 |
| 2,669,511 | 2/1954 | Whitney | 75—43 |
| 3,078,084 | 2/1963 | Foresi et al. | 75—43 X |
| 3,141,055 | 7/1964 | Schmitt | 75—43 X |
| 3,150,963 | 9/1964 | Kurzinski | 75—43 X |
| 3,194,650 | 7/1965 | Kurzinski | 75—43 |
| 3,232,595 | 2/1966 | Balster | 75—43 X |
| 3,347,660 | 10/1967 | Smith et al. | 75—43 |

HYLAND BIZOT, *Primary Examiner.*

H. TARRING, *Assistant Examiner.*